(12) United States Patent
Tsai et al.

(10) Patent No.: US 10,454,652 B2
(45) Date of Patent: Oct. 22, 2019

(54) METHODS OF ENABLING MULTIUSER SUPERPOSITION TRANSMISSION

(71) Applicant: MEDIATEK INC., Hsinchu (TW)

(72) Inventors: Lung-Sheng Tsai, Tainan (TW); Pei-Kai Liao, Nantou County (TW); Yi-Ju Liao, Hsinchu (TW); Chien-Hwa Hwang, Hsinchu County (TW)

(73) Assignee: HFI Innovation INC., Hsin-Chu (TW)

( * ) Notice: Subject to any disclaimer, the term of this patent is extended or adjusted under 35 U.S.C. 154(b) by 278 days.

(21) Appl. No.: 15/227,204

(22) Filed: Aug. 3, 2016

(65) Prior Publication Data

US 2017/0041906 A1 Feb. 9, 2017

Related U.S. Application Data

(60) Provisional application No. 62/201,052, filed on Aug. 4, 2015.

(51) Int. Cl.
*H04W 72/04* (2009.01)
*H04L 5/00* (2006.01)
(Continued)

(52) U.S. Cl.
CPC .......... *H04L 5/0062* (2013.01); *H04L 1/0009* (2013.01); *H04L 5/0037* (2013.01);
(Continued)

(58) Field of Classification Search
CPC ... H04L 1/0009; H04L 5/0037; H04L 5/0062; H04W 52/262; H04W 52/34; H04W 52/346; H04W 72/1289
See application file for complete search history.

(56) References Cited

U.S. PATENT DOCUMENTS

2007/0086371 A1 4/2007 Makhijani et al. ........... 370/328
2014/0307696 A1 10/2014 Choi et al. ..................... 370/329
(Continued)

FOREIGN PATENT DOCUMENTS

CN          103037511 A    4/2013
WO      WO2015029729 A1    3/2015

OTHER PUBLICATIONS

International Search Report and Written Opinion of International Search Authority for PCT/CN2016/093183 dated Nov. 2, 2016 (11 pages).
(Continued)

*Primary Examiner* — Kevin C Harper
*Assistant Examiner* — Derrick V Rose
(74) *Attorney, Agent, or Firm* — Imperium Patent Works; Zheng Jin

(57) ABSTRACT

Methods of enabling multiuser superposition transmission (MUST) in LTE systems are proposed. MUST operation allows simultaneous transmission for multiple co-channel users on the same time-frequency resources. A higher-layer signaling is used for configuring a UE to enable MUST in each transmission mode (TM). MUST is a sub-TM of each TM. When a UE is configured by higher layer to enable MUST, the UE will monitor new DCI formats supported by the configured TM with new fields carrying scheduling information of another co-channel UE. Dynamic switching between MUST and non-MUST operation is allowed. Mixed transmission schemes and precoders among co-channel UEs are also supported.

16 Claims, 4 Drawing Sheets

(51) Int. Cl.
  *H04L 1/00* (2006.01)
  *H04W 52/26* (2009.01)
  *H04W 52/34* (2009.01)
  *H04W 72/12* (2009.01)

(52) U.S. Cl.
  CPC ....... *H04W 52/262* (2013.01); *H04W 52/346* (2013.01); *H04W 52/34* (2013.01); *H04W 72/1289* (2013.01)

(56) References Cited

U.S. PATENT DOCUMENTS

| | | | |
|---|---|---|---|
| 2015/0016361 A1 | 1/2015 | Kim et al. | 370/329 |
| 2016/0128025 A1* | 5/2016 | Zhang | H04J 11/005 370/329 |
| 2016/0219529 A1 | 7/2016 | Benjebbour et al. | 370/328 |
| 2016/0309542 A1* | 10/2016 | Kowalski | H04L 27/3488 |
| 2016/0374060 A1* | 12/2016 | Lim | H04L 5/0048 |

OTHER PUBLICATIONS

EPO, search report for the EP patent application 16832334.3 dated Apr. 12, 2018 (8 pages).
R1-153273 3GPP TSG RAN WG1 Meeting #81, Institute for Information Industry (III), "Discussion on Possible PDCCH Modification for Downlink MUST", Fukuoka, Japan, May 25-29, 2015.

* cited by examiner

| TRANSMISSION MODE | DCI FORMAT | TRANSMISSION SCHEM OF PDSCH CORRESPONDING TO PDCCH |
|---|---|---|
| TM 3 | DCI FORMAT 1A | TRANSMIT DIVERSITY |
| | DCI FORMAT 2A | LARGE DELAY CDD OR TRANSMIT DIVERSITY |
| TM 3 WITH MUST | DCI FORMAT 1A+ | TRANSMIT DIVERSITY |
| | DCI FORMAT 2A+ | LARGE DELAY CDD OR TRANSMIT DIVERSITY |
| TM 4 | DCI FORMAT 1A | TRANSMIT DIVERSITY |
| | DCI FORMAT 2 | CLOSED-LOOP SPATIAL MULTIPLEXING OR TRANSMIT DIVERSITY |
| TM 4 WITH MUST | DCI FORMAT 1A+ | TRANSMIT DIVERSITY |
| | DCI FORMAT 2+ | CLOSED-LOOP SPATIAL MULTIPLEXING OR TRANSMIT DIVERSITY |

FIG. 3

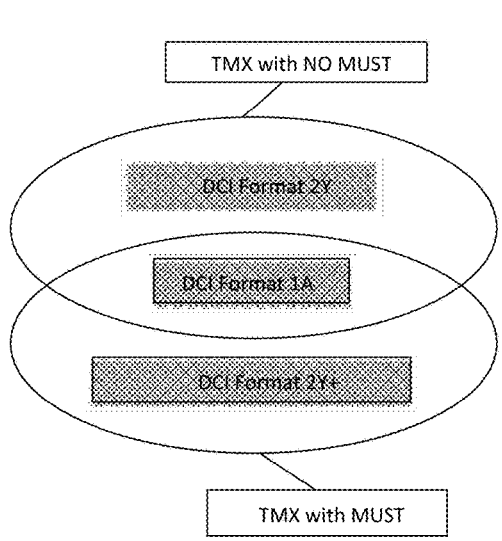
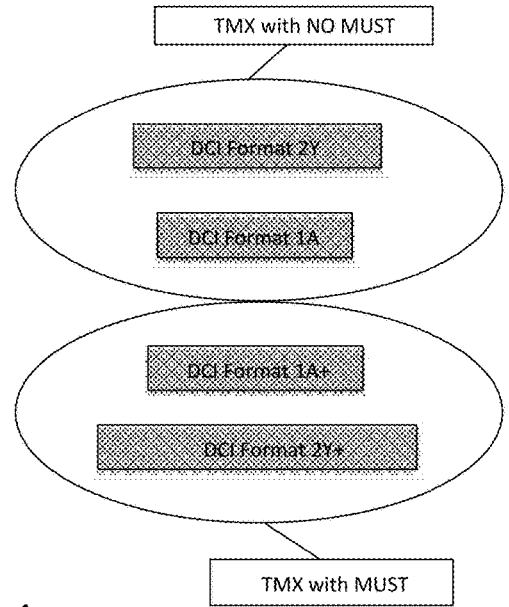

FIG. 4

METHODS OF ENABLING MULTIUSER SUPERPOSITION TRANSMISSION

CROSS REFERENCE TO RELATED APPLICATIONS

This application claims priority under 35 U.S.C. § 119 from U.S. Provisional Application No. 62/201,052, entitled "Methods of Enabling Multiuser Superposition Transmission," filed on Aug. 4, 2015, the subject matter of which is incorporated herein by reference.

TECHNICAL FIELD

The disclosed embodiments relate generally to mobile communication networks, and, more particularly, to methods of enabling multiuser superposition transmission in mobile communication systems.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of MU operation from both transmitter and receiver's perspective has the potential to further improve MU system capacity even if the transmission and precoding is non-orthogonal. For example, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth.

Multi-user superposition transmission (MUST) is a new technique of such joint optimization associated with power allocation and interference cancellation to enable high system capacity in LTE networks. It is under investigation in LTE Release-13. It may include two commonly discussed multi-user transmission approaches, MU-MIMO, and non-orthogonal multiple access (NOMA). The MU-MIMO approach transmits signals intended to different users with orthogonal (or quasi-orthogonal) precoders. In contrast, the NOMA approach tends to precode transmitted signals for co-channel users by same spatial direction with un-equal power allocation.

MUST technique is not limited to MU-MIMO or NOMA; it allows simultaneous transmission for multiple users on the same time-frequency resources. A serving base station pairs two or more users together, and applies transmit beamforming (precoding) derived from channel information feedback to achieve transmission of multiple transport-blocks to multiple users. The used precoder for each user could be the same or not. As a result, one may expect that the mutual interference between the co-channel transmissions to multiple mobile stations would degrade performance seriously. Fortunately, with a proper design on the power allocation, the code-rate, and modulation order of the co-channel signals, and some assisted information for the signal format of un-wanted interference, it is possible to let a UE cancel the unwanted co-channel interference intended for other UEs. A solution is sought to enable MUST operation in LTE networks to achieve high system capacity.

SUMMARY

Methods of enabling multiuser superposition transmission (MUST) in LTE systems are proposed. MUST operation allows simultaneous transmission for multiple co-channel users on the same time-frequency resources. A higher-layer signaling is used for configuring a UE to enable MUST in each transmission mode (TM). MUST is a sub-TM of each TM. When a UE is configured by higher layer to enable MUST, the UE will monitor new DCI formats supported by the configured TM with new fields carrying scheduling information of another co-channel UE. Dynamic switching between MUST and non-MUST operation is allowed. Mixed transmission schemes and precoders among co-channel UEs are also supported.

In one embodiment, a user equipment (UE) receives a higher-layer signaling from a base station in a mobile communication network. The higher-layer signaling indicates whether multiuser superposition transmission (MUST) is enabled. The UE detects a physical layer control signaling related to data transmission in a time slot based on the higher layer signaling. The physical layer control signaling is carried by a MUST-supporting DCI format for a configured transmission mode if MUST is enabled. Otherwise, the physical layer control signaling is carried by a legacy DCI format for the configured transmission mode if MUST is not enabled. The UE decodes the MUST-supporting DCI format to determine scheduling information of the UE and MUST-related information of a co-channel UE. The UE applies interference cancellation of a superposed interference signal from the co-channel UE based on the MUST-related information.

In another embodiment, a base station transmits a higher-layer signaling to one or more user equipments (UEs) in a mobile communication network. The higher-layer signaling indicates whether multiuser superposition transmission (MUST) is enabled for the one or more UEs. The base station transmits a physical layer control signaling related to data transmission in a time slot based on the higher layer signaling. The physical layer control signaling is carried by a MUST-supporting DCI format for a configured transmission mode if MUST is enabled. The MUST-supporting DCI format carries scheduling information and MUST-related information of the UEs. Otherwise, the physical layer control signaling is carried by a legacy DCI format for the configured transmission mode if MUST is not enabled. The base station performs data transmission in the time slot to the UEs based on the scheduling information and the MUST-related information.

Other embodiments and advantages are described in the detailed description below. This summary does not purport to define the invention. The invention is defined by the claims.

BRIEF DESCRIPTION OF THE DRAWINGS

FIG. 3 illustrates downlink control information (DCI) formats and transmission modes associated with MUST operation in accordance with one novel aspect.

FIG. 4 illustrates embodiments of physical-layer control signaling and DCI formats for MUST operation in accordance with one novel aspect.

DETAILED DESCRIPTION

Reference will now be made in detail to some embodiments of the invention, examples of which are illustrated in the accompanying drawings.

Figure 1:
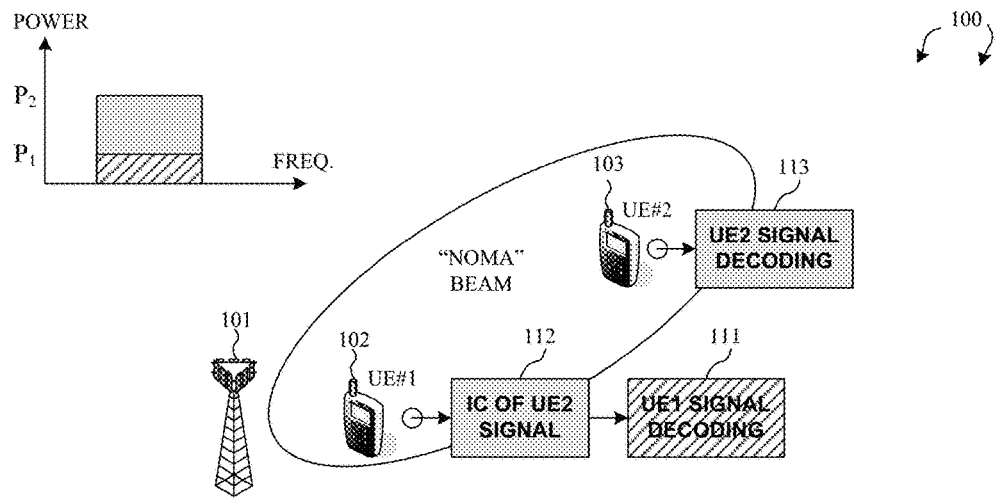
FIG. 1 illustrates a mobile communication network supporting multiuser superposition transmission (MUST) operation in accordance with one novel aspect.

FIG. 1 illustrates a mobile communication network 100 supporting multiuser superposition transmission (MUST) operation in accordance with one novel aspect. Mobile communication network 100 is an OFDM network comprising a serving base station eNB 101, a first user equipment 102 (UE#1), and a second user equipment 103 (UE#2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

Multi-user superposition transmission (MUST) allows simultaneous transmission for multiple users on the same time-frequency resources. A base station pairs two or more users together and applies transmit beamforming (precoding) and power allocation derived from channel information feedback to achieve transmission of multiple transport-blocks to multiple users. The used precoder for each user may be the same or not. The allocated power for superposed users is related to channel quality of the users. As a result, one may expect that the mutual interference between the co-channel transmissions to multiple mobile stations would degrade performance seriously. Fortunately, with a proper design on the power allocation, the code-rate, and modulation order of the co-channel signals, and some assisted information for the signal format of un-wanted interference, it is possible to let a UE remove the unwanted co-channel interference intended for other superposed UEs.

In the example of FIG. 1, downlink multiuser superposition transmission (MUST) scheme is used. In MUST, the signals intended for two users are superposed and occupy the same time-frequency radio resource. To benefit from MUST, the two co-scheduled users generally need to have a large difference in the received signal quality, e.g., in terms of the received signal-to-interference-plus-noise ratio (SINR). In a typical scenario, one of the users (e.g., UE#1) is geometrically close to the base station, and the other user (e.g., UE#2) is geometrically far away from the base station. The former user and the latter user are also referred to as the near-user and far-user respectively.

As shown in FIG. 1, UE#1 receives intra-cell interfering radio signal 112 transmitted from the same serving eNB 101 due to non-orthogonal multiple access (NOMA) operation intended for multiple UEs (e.g., UE#2) in the same serving cell. For NOMA operation, the signals to the two UEs are superposed and precoded with the same precoder and transmitted over the same spatial layer (the "NOMA" beam). UE#1 may be equipped with an interference cancellation (IC) receiver that is capable of cancelling the contribution of the interfering signal 112 from the desired signal 111.

Typically, the transmit power allocated for the signal dedicated to the far-user (UE#2) $P_2$ is in general much stronger than to the near-user (UE#1) $P_1$. It can be shown that such power allocation strategy maximizes the system throughput in the sense of proportional fairness. From UE#1's perspective, since it is much close to eNB 101 and has a better received quality of UE#2's signal than UE#2 does, UE#1 can decode the signal dedicated to UE#2. After UE#1 decodes UE#2's information bits, the signal dedicated to UE#2 is reconstructed and then subtracted from the received signal to form a clean received signal. UE#1 can therefore decode its own signal via the clean received signal. The operation of NOMA thus requires each co-channel UE (especially the near-user) to acquire assistance information from the network to reconstruct and cancel the interfering signal. Furthermore, dynamic switching between NOMA and OMA, mixed transmission schemes, and different precoders for different UEs may also be supported under proper MUST configuration.

Figure 2:
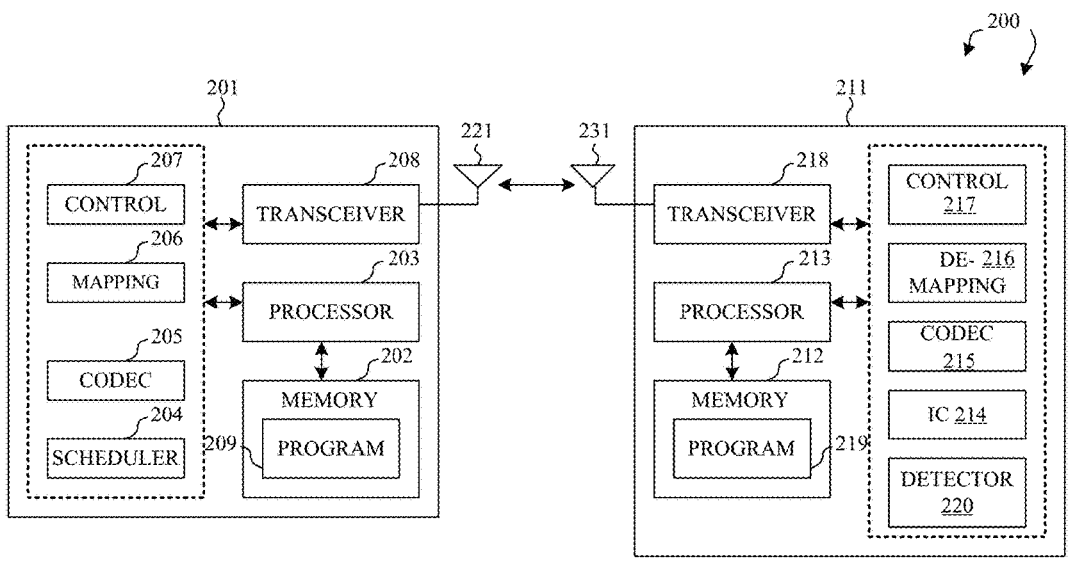
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via codec 205), mapping (via mapping circuit 206), and transmit control information and data (via control circuit 207) to UE 211, and allow UE 211 to receive, de-mapping (via de-mapper 216), and decode (via codec 215) the control information and data (via control circuit 217 and detector 220) accordingly with interference cancellation capability. In one example of MUST operation, base station 201 provides assistant information that include parameters related to interfering signals to UE 211. Upon receiving the related parameters via higher-layer (RRC) signaling and physical-layer (PDCCH) control signaling, UE 211 is then able to perform interference cancellation via interference canceller 214 to cancel the contribution of the co-channel interfering signals accordingly.

FIG. 3 illustrates downlink control information (DCI) formats and transmission modes associated with MUST operation in accordance with one novel aspect. In LTE system, before decoding the desired data information carried by PDSCH, a UE needs to check all possible E/PDCCH locations to detect the E/PDCCH transmission used to carry DCI intended for it and then extract the control information corresponding to its PDSCH signal. In LTE Release-12, there are 10 transmission modes (TMs) specified. Each TM is associated with two possible transmission schemes and each scheme is associated with a DCI format. As illustrated in Table 300 of FIG. 3, DCI format 1A and format 2A are used for TM 3. DCI format 1A corresponds to transmit diversity (TxD) and DCI format 2A is for large delay CDD or TxD. DCI format 1A and format 2 are used for TM 4. DCI format 1A corresponds to TxD and DCI format 2 is for closed-loop spatial multiplexing or TxD. Once a UE is configured to a certain transmission mode (TM), it should decode the used DCI format carried in its detected PDCCH to exactly know the transmission scheme of the scheduled PDSCH.

For scheduling flexibility and optimized system performance, it is proposed that MUST operation is a sub-mode of each transmission mode in existing LTE system, not a new transmission mode. In addition to transmission mode configuration, a UE can be configured by higher layer (e.g. RRC layer) to enable MUST operation or not. When a UE is configured by higher layer (e.g. RRC layer) for non-MUST operation, the UE monitors legacy physical-layer control signaling (e.g. DCI formats carried by E/PDCCH) to obtain the scheduling information related to the scheduled data transmission intended to the UE for the decoding of the scheduled data transmission. When a UE is configured by higher layer for MUST operation, the UE monitors new physical-layer control signaling (e.g. new DCI formats carried by E/PDCCH) to obtain the scheduling information related to the scheduled data transmission intended to the UE and the assisted information related to the co-scheduled or superposed data transmission(s) intended to other co-scheduled or superposed UE(s) for the decoding of the scheduled data transmission.

To simplify the design of new DCI formats that contain MUST-related information, one possible solution is to extend from the existing DCI formats. For example, for the legacy DCI format X, where X can be 1, 1A, 2, 2A, 2B, 2C, 2D, and so on, we define a new DCI format X+ that preserves all or most of fields in DCI format X, and additionally contains new fields specially associated with MUST scheme. Thus when a UE is configured to enable MUST, it should expect to receive the DCI formats X+ carried by E/PDCCH. In the example of FIG. 3, for transmission mode TM3 with MUST, new DCI format 1A+ and 2A+ are used. For transmission mode TM4 with MUST, new DCI format 1A+ and 2+ are used.

FIG. 4 illustrates embodiments of physical-layer control signaling and DCI formats for MUST operation in accordance with one novel aspect. When a UE is configured by higher layer to enable MUST, it will monitor new DCI formats supported by the configured TM with new fields carrying certain scheduling information of another superposed UE. Under MUST, two superposed UEs (near-user and far-user) receive separate DCI formats for its own scheduling information. Only the near-user needs scheduling information of the far-user. In Option 1, for TMX with MUST, the DCI format for far-user is the same as the legacy DCI formant, e.g., DCI format 1A, while the DCI format for near-user is the new DCI format, e.g., DCI format 2Y+. The advantage of option 1 is that legacy UEs can also be selected for MUST operation as a far-user. In option 2, for TMX with MUST, new DCI formats are used for both near-user and far-user. The advantage of option 2 is that additional information can also be provided to the far-user via the new DCI format X+. In option 2, network still can select a legacy UE for MUST operation as a far-user by signaling this UE via the legacy DCI format X, without providing information related to co-channel interference signal.

In addition to existing fields in DCI format X, the new DCI format X+ supporting MUST operation can contain a full set or a subset of the following information: Power allocation among co-scheduled or superposed users; Modulation order (MOD) or modulation and coding scheme (MCS) of the other co-scheduled or superposed UE(s); New data indicator of the other co-scheduled or superposed UE(s); Redundancy version of the other co-scheduled or superposed UE(s); Single or dual transport blocks of the other co-scheduled or superposed UE(s); Resource allocation of the other co-scheduled or superposed UE(s); Spatial precoder vector(s) of the other co-scheduled or superposed UE(s); Transmission scheme of the other co-scheduled or superposed UE(s); Reference signal(s) used by the other co-scheduled or superposed UE(s). It would be helpful for a MUST UE to take advantage of the information above to cancel the intra-cell interference due to the other superposed UEs, for example, by symbol-level interference cancellation (SLIC) or codeword-level interference cancellation (CWIC).

If the DCI overhead carrying MUST-related information is a concern, it is possible to leverage UE's capability to blindly detect some of the parameters listed above without signaling in DCI formats, e.g. spatial precoder vector(s) of the other superposed UE(s) and transmission scheme of the other superposed UE(s). It's also possible to move some of the fields from DCI to higher-layer (e.g. RRC-layer) signaling, e.g. a set of potential spatial precoder vector(s) of the other superposed UE(s) and a set of potential transmission scheme(s) of the other superposed UE(s). However, it may degrade the receiver performance due to the uncertainty of the parameters. Furthermore, power allocation and MOD/MCS of all superposed users can be jointly indicated by a configuration index of a look-up table, which lists all possible configurations.

Figure 5:
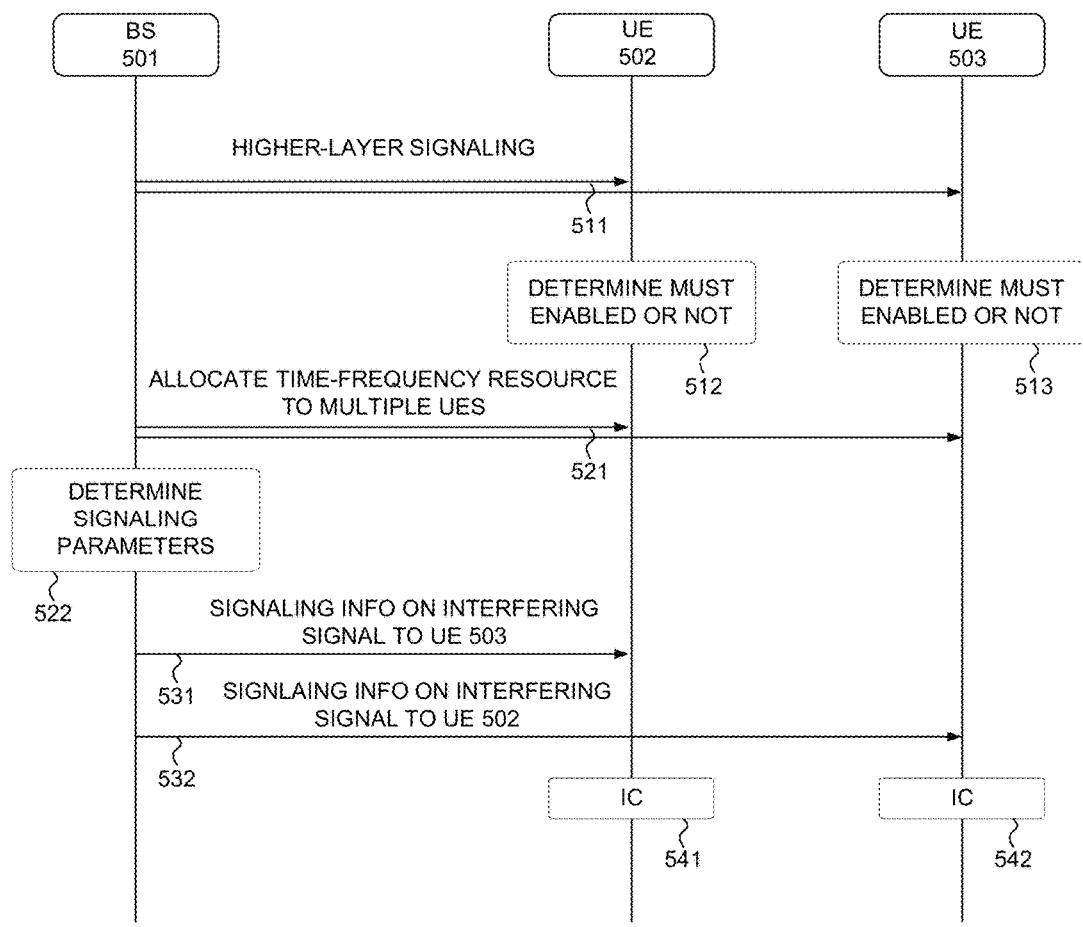
FIG. 5 illustrates a downlink MUST configuration and operation between a BS and two co-channel UEs in accordance with one novel aspect.

FIG. 5 illustrates a downlink MUST configuration and operation between a BS and two co-channel UEs in accordance with one novel aspect. In step 511, BS 501 sends semi-static higher-layer signaling (RRC message) to UE 502 and UE 503 for enabling or disabling MUST operation for a configured transmission mode. In step 512, UE 502 determines whether MUST is enabled or not. In step 513, UE 503 determines whether MUST in enabled or not. In step 521, BS 501 allocates a time-frequency resource to multiple UEs including UE 502 and UE 503 for data transmission under NOMA operation on a subframe basis via PDCCH signaling. In step 522, BS 501 determines which parameters about interfering signals need to be signaled to the UEs. In step 531, BS 501 signals UE 502 scheduling information about interfering signals dedicated to UE 503. In step 532, BS 501 signals UE 503 scheduling information about interfering signals dedicated to UE 502. Note that such information may be signaled separately or aggregated together in one message. In step 541, UE 502 performs IC based on the received information. In step 542, UE 503 performs IC based on the received information. In an alternative embodiment, either UE 502 or UE 503 (e.g., the near-user) performs IC.

Since MUST configuration is semi-static, for scheduling flexibility and optimized system performance, the base station can be allowed to switch between MUST and non-MUST operation dynamically via PDCCH signaling. If the dynamic switch between MUST and non-MUST operation is allowed in the network, whether MUST operation exists on all or part of the time-frequency resources assigned to this UE for data transmission can be implied by a default value of one or multiple fields within the assisted information related to the co-scheduled or superposed data transmission(s).

In one example, if co-channel PDSCH intended for other UE exists, a UE can be configured to enable MUST though RRC-layer signaling, while still keeping the legacy relationships that each TM is associated with two possible transmission schemes of a UE and each transmission scheme is corresponding to a DCI format. A UE detects its scheduled transmission scheme by detecting the DCI format it receives. For a UE configured to enable MUST, it should detect the two possible DCI formats to know the transmission scheme that its PDSCH uses. Different from the DCI formats designed for the legacy users without supporting MUST, the two MUST-supporting DCI formats may contain fields that specify information specially related to the settings of the applied MUST scheme to facilitate the cancelation or suppression for other co-channel superposed interference signals at this UE. For example, the MUST-related information could be the power allocation for this UE or for all the co-channel UEs, or/and the modulation and coding scheme (MCS) used for the PDSCH of the other co-channel UEs. Based on such information UE can perform either SLIC or CWIC to improve the quality of receiving desired signal.

In contrast to the discussed concept of enabling MUST under the definitions of legacy transmission modes, it is possible to introduce a new transmission mode supporting MUST operation. Under this new TM, new DCI formats should be introduced accordingly to contain new fields specific to MUST; they may be similar to the DCI format X+ presented in previous sections. However, these new DCI formats may need to further indicate (or imply by these distinguishable formats themselves) what kind of transmission scheme is going to be used. To support MUST, network would configure its served users by this new TM and send corresponding control-signaling though the new DCI formats. If a user is configured with this newly defined TM, then it monitors the new DCI formats to obtain control information supporting MUST operation.

Figure 6:
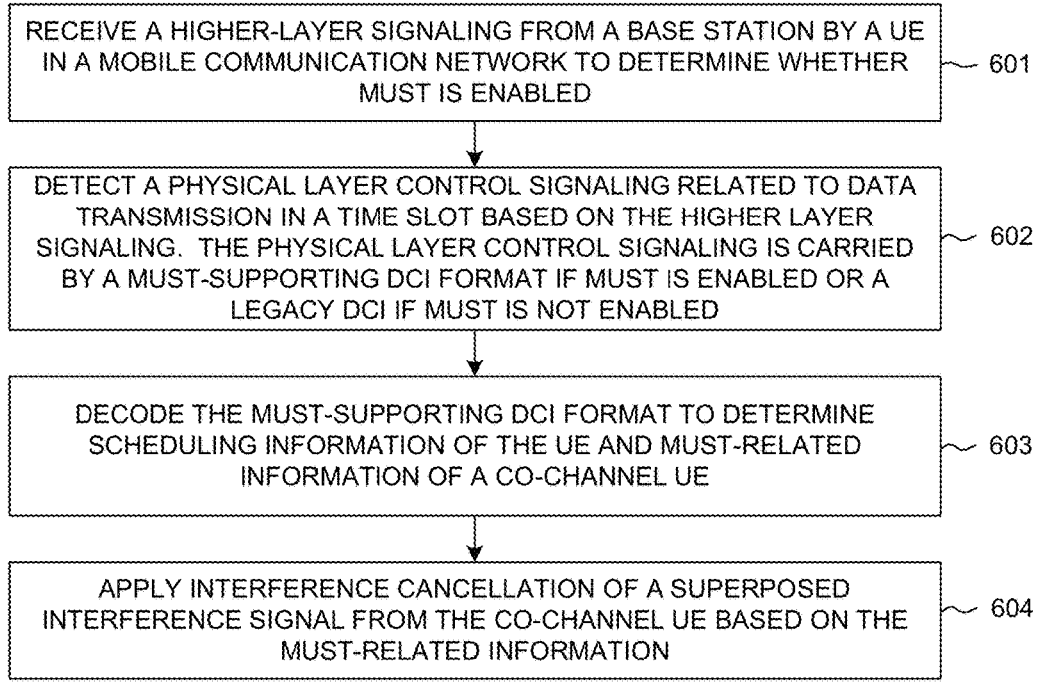
FIG. 6 is a flow chart of a method of enabling MUST operation from UE perspective in accordance with one novel aspect.

FIG. 6 is a flow chart of a method of enabling MUST operation from UE perspective in accordance with one novel aspect. In step 601, a user equipment (UE) receives a higher-layer signaling from a base station in a mobile communication network. The higher-layer signaling indicates whether multiuser superposition transmission (MUST) is enabled. In step 602, the UE detects a physical layer control signaling related to data transmission in a time slot based on the higher layer signaling. The physical layer control signaling is carried by a MUST-supporting DCI format for a configured transmission mode if MUST is enabled. Otherwise, the physical layer control signaling is carried by a legacy DCI format for the configured transmission mode if MUST is not enabled. In step 603, the UE decodes the MUST-supporting DCI format to determine scheduling information of the UE and MUST-related information of a co-channel UE. In step 604, the UE applies interference cancellation of a superposed interference signal from the co-channel UE based on the MUST-related information.

Figure 7:
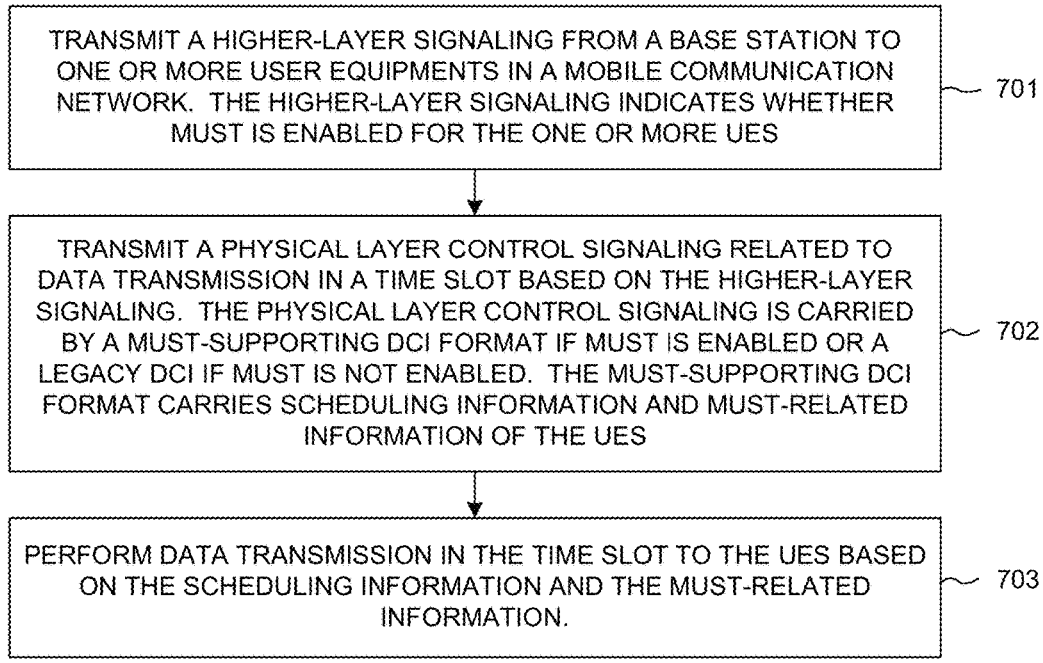
FIG. 7 is a flow chart of a method of enabling MUST operation from eNB perspective in accordance with one novel aspect.

FIG. 7 is a flow chart of a method of enabling MUST operation from eNB perspective in accordance with one novel aspect. In step 701, a base station transmits a higher-layer signaling to one or more user equipments (UEs) in a mobile communication network. The higher-layer signaling indicates whether multiuser superposition transmission (MUST) is enabled for the one or more UEs. In step 702, the base station transmits a physical layer control signaling related to data transmission in a time slot based on the higher layer signaling. The physical layer control signaling is carried by a MUST-supporting DCI format for a configured transmission mode if MUST is enabled. The MUST-supporting DCI format carries scheduling information and MUST-related information of the UEs. Otherwise, the physical layer control signaling is carried by a legacy DCI format for the configured transmission mode if MUST is not enabled. In step 703, the base station performs data transmission in the time slot to the UEs based on the scheduling information and the MUST-related information.

Example Solution for TM1 and TM2

For TM1 or TM2 with NO-MUST enabling configuration, both DCI format 1A and DCI format 1 support single-antenna port or transmit diversity scheme based on the number of antenna ports used by PBCH. The difference between the two formats is that DCI format 1A is more compact format using fewer bits to represent the decision of resource allocation, at cost of some scheduling flexibility.

For TM1 or TM2 with MUST enabling configuration, DCI format 1A+ and DCI format 1+ can be defined to include some new fields related to MUST operation. It's up to the network to dynamically switch between non-MUST and MUST schemes and non-MUST scheme can be implied by a default value of the assisted signaling related to MUST operation. For example, DCI format 1A+ may contain all or most of fields in format 1A, and additionally one new field for the power allocation of the MUST UE(s).

Example Solution for TM3

For TM3 with NO MUST enabling configuration, DCI format 1A supports transmit diversity scheme based on the number of antenna ports used by PBCH, and DCI format 2A supports transmit diversity or large delay CDD scheme. When a UE detects that DCI format 2A is used, using transmit diversity scheme or large delay CDD scheme is determined by the number of enabled codewords.

For TM3 with MUST enabling configuration, DCI format 1A+ can be defined to include some new fields related to MUST operation to support the transmit diversity scheme while DCI format 2A+ can be defined to include some new fields related to MUST operation to support the transmit diversity scheme and the large delay CDD scheme. It's up to the network to dynamically switch between non-MUST and MUST schemes and non-MUST scheme can be implied by a default value of the assisted signaling related to MUST operation.

There are several possible eNB scheduling cases shown as follows to support MUST for superposed UEs: eNB may schedule the superposed users by DCI format 1A+ for the superposition transmission of transmit diversity scheme using the same resource allocation scheme; eNB may schedule the superposed users by DCI format 2A+ for the superposition transmission of transmit diversity scheme using the same resource allocation scheme; eNB may schedule the superposed users by DCI format 2A+ for the superposition transmission of large delay CDD scheme using the same resource allocation scheme; eNB may schedule the superposed users by DCI format 2A+ for the superposition transmission of transmit diversity scheme and large delay CDD scheme using the same resource allocation scheme; eNB may schedule the superposed users by DCI format 1A+ and DCI format 2A+ for the superposition transmission of transmit diversity scheme using different resource allocation schemes; eNB may schedule the superposed users by DCI format 1A+ and DCI format 2A+ for the superposition transmission of transmit diversity scheme and large delay CDD scheme using different resource allocation schemes.

Based on the received DCI format, UE can blindly detect whether there is superposition transmission and which superposition transmission scheme eNB uses. There are several UE behaviors shown as follows to support MUST when different eNB scheduling cases happen. When UE receives DCI format 1A+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses large delay CDD scheme. When UE receives DCI format 2A+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses large delay CDD scheme.

Example Solution for TM4

For TM4 case with NO MUST enabling configuration, DCI format 1A supports transmit diversity scheme based on the number of antenna ports used by PBCH, and DCI format 2 supports transmit diversity scheme or closed-loop spatial multiplexing scheme based on the number for antenna ports used by PBCH.

For TM4 with MUST enabling configuration, DCI format 1A+ can be defined to include some new fields related to MUST operation to support the transmit diversity scheme while DCI format 2+ can be defined to include some new fields related to MUST operation to support the transmit diversity scheme and the closed-loop spatial multiplexing scheme. It's up to the network to dynamically switch between non-MUST and MUST schemes and non-MUST scheme can be implied by a default value of the assisted signaling related to MUST operation.

There are several possible eNB scheduling cases shown as follows to support MUST for superposed UEs: eNB may schedule the superposed users by DCI format 1A+ for the superposition transmission of transmit diversity scheme using the same resource allocation scheme; eNB may schedule the superposed users by DCI format 2+ for the superposition transmission of transmit diversity scheme using the same resource allocation scheme; eNB may schedule the superposed users by DCI format 2+ for the superposition transmission of closed-loop spatial multiplexing scheme using the same resource allocation scheme and the same spatial precoding vector(s); eNB may schedule the superposed users by DCI format 2+ for the superposition transmission of closed-loop spatial multiplexing scheme using the same resource allocation scheme and different spatial precoding vector(s); eNB may schedule the superposed users by DCI format 2+ for the superposition transmission of transmit diversity scheme and closed-loop spatial multiplexing scheme using the same resource allocation scheme; eNB may schedule the superposed users by DCI format 1A+ and DCI format 2+ for the superposition transmission of transmit diversity scheme using different resource allocation schemes; eNB may schedule the superposed users by DCI format 1A+ and DCI format 2+ for the superposition transmission of transmit diversity scheme and closed-loop spatial multiplexing scheme using different resource allocation schemes.

Based on the received DCI format, UE can blindly detect whether there is superposition transmission and which superposition transmission scheme eNB uses. There are several UE behaviors shown as follows to support MUST when different eNB scheduling cases happen. When UE receives DCI format 1A+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses closed-loop spatial multiplexing scheme. When UE receives DCI format 2+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses closed-loop spatial multiplexing scheme using the same spatial precoding vector(s); 4) the other superposed UE uses closed-loop spatial multiplexing scheme using different spatial precoding vector(s).

Example Solution for TM9

TM 8, 9 and 10 are very similar TMs using precoded DMRS as the pilot signal for channel estimation. Here we present the case of TM9 as an example. For TM9 case with NO MUST enabling configuration, DCI format 1A supports transmit diversity scheme based on the number of antenna ports used by PBCH, and DCI format 2C supports up to 8-layer transmission scheme based on the number of antenna ports configured by higher layer.

For the case with MUST enabling configuration, DCI format 1A+ can be defined to include some new fields related to MUST operation to support the transmit diversity scheme while DCI format 2C+ can be defined to include some new fields related to MUST operation include some new fields related to MUST operation to support up to 8-layer transmission scheme based on the number of antenna ports configured by higher layer (e.g. RRC layer). It's up to the network to dynamically switch between non-MUST and MUST schemes and non-MUST scheme can be implied by a default value of the assisted signaling related to MUST operation.

There are several possible eNB scheduling cases shown as follows to support MUST for superposed UEs: eNB may schedule the superposed users by DCI format 1A+ for the superposition transmission of transmit diversity scheme using the same resource allocation scheme; eNB may schedule the superposed users by DCI format 2C+ for the superposition transmission of up to 8-layer transmission scheme using the same resource allocation scheme and the same spatial precoding vector(s); eNB may schedule the superposed users by DCI format 2C+ for the superposition transmission of up to 8 layer transmission scheme using the same resource allocation scheme and different spatial precoding vector(s); eNB may schedule the superposed users by DCI format 1A+ and DCI format 2C+ for the superposition transmission of transmit diversity scheme and up to 8-layer transmission scheme using different resource allocation schemes.

Based on the received DCI format, UE can blindly detect whether there is superposition transmission and which superposition transmission scheme eNB uses. There are several UE behaviors shown as follows to support MUST when different eNB scheduling cases happen. When UE receives DCI format 1A+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses up to 8-layer transmission scheme. When UE receives DCI format 2C+, it should determine which of the following cases can be assumed based on blind detection or/and DCI format/higher-layer (e.g. RRC-layer) signaling. The different cases are: 1) no other superposed UE; 2) the other superposed UE uses transmit diversity scheme; 3) the other superposed UE uses up to 8-layer transmission scheme using the same spatial precoding vector(s); 4) the other superposed UE uses up to 8-layer transmission scheme using different spatial precoding vector(s).

Because TM8, TM9, and TM10 are DMRS-based TMs, it's not always necessary to signal the used precoders of superposed UEs and UE can easily obtain the composite result of the applied spatial precoding vector(s) and the channel by channel estimation over DMRS. The new MUST DCI format to support TM8/9/10 MUST could include the following: Modulation order (MOD) or modulation and coding scheme (MCS) of the other superposed UE(s); New data indicator of the other superposed UE(s); Redundancy version of the other superposed UE(s); Single or dual transport blocks of the other superposed UE(s); Resource allocation of the other superposed UE(s); Transmission scheme of the other superposed UE(s)—A new DCI format contains information related to the used transmission scheme of the other superposed users; Reference signal(s) used by the other superposed UE(s)—A new DCI format contains information related to the used DMRS port(s) of the superposed users who are scheduled to use spatial-multiplexing transmission scheme. Based on the DCI information, UE detects which transmit scheme (either spatial-multiplexing transmission scheme or different spatial precoding vectors or single antenna port scheme) by detecting the presence of the DMRS port associated with the other superposed UE.

Resource Allocation Information

Note that there are multiple DCI formats supporting TxD. For example, DCI format 1A and 1 in TM1/2, format 1A and 2A for TM3, and so on. The main difference between format 1A and other formats is the resource allocation granularity. In LTE, the most scheduling-flexible approach to signal resource-allocation is to signal a bitmap with a size the same as the number of resource blocks within the cell bandwidth. However, this way may result in significant overhead especially when the cell-bandwidth is large. To reduce overhead, grouping of contiguous resource blocks is supported in DCI format 1, 2, 2A, 2B, 2C, and 2D for type-0 resource allocation. A serving cell only needs to signal a bitmap of resource-block groups (RBGs) with reduced signaling overhead instead of signaling for each resource block. Among the current standardized DCI formats, for DCI format 1 (for TM1, TM2, and TM7), DCI format 2 (for TM4), 2A (for TM3), 2B (for TM8), 2C (for TM9), and 2D (for TM10), there is a one-bit field to be signaled from serving cell so that a UE can know either type-0 or type-1 RB-allocation is used. If type-1 RB-allocation is used, the resource allocation is per-RB based with additional constraints. If the UE learned that the resource allocation of the superposed interference signal is restricted to type 0, it can assume that transmission parameters including RI, MOD, and the presence/absence of the interference are the same for the physical resource-block "pair" in two slots in one subframe. Such an assumption can improve the detection reliability of those transmission parameters used by the co-channel interference. If not so indicated, a UE must do per-RB based detection for transmission parameters of interference.

For a MUST UE, if it needs to detect some parameters of the other superposed MUST UE, for example, the modulation order, we may take advantage of the RB-grouping property to improve blind detection quality because the modulation order used by the superposed UE is the same within one RBG. In one embodiment, we let DCI format X+ imply that all superposed MUST UEs are assigned RB-allocation by the same resource allocation rule as this DCI format X+ specifies.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a higher-layer signaling from a base station by a user equipment (UE) in a mobile communication network to determine whether multiuser superposition transmission (MUST) is enabled;

detecting a physical-layer control signaling related to data transmission based on the higher-layer signaling, wherein the physical-layer control signaling for the UE is carried by a MUST-supporting downlink control information (DCI) format for a configured transmission mode when MUST is enabled, otherwise the physical-layer control signaling is carried by a legacy DCI format for the configured transmission mode when MUST is not enabled;

decoding the physical-layer control signaling carried by the single MUST-supporting DCI format to determine scheduling information of the UE and MUST-related information of a co-channel UE; and applying interference cancellation of a superposed interference signal from the co-channel UE based on the MUST-related information.

2. The method of claim 1, wherein the MUST-related information comprises power allocation information among the UE and the co-channel UE.

3. The method of claim 1, wherein the MUST-related information comprises an indication of a modulation order or a modulation and coding scheme (MCS) used by the data transmission intended for the co-channel UE.

4. The method of claim 1, wherein the MUST-related information comprises an indication of a transmission scheme of the co-channel UE.

5. The method of claim 1, wherein the MUST-related information comprises an indication of reference signals associated with the data transmission intended for the co-channel UE.

6. The method of claim 1, wherein the MUST-supporting DCI format is associated with a legacy transmission mode and corresponding transmission schemes.

7. The method of claim 1, wherein the MUST-supporting DCI format is associated with a new transmission mode supporting MUST operation.

8. The method of claim 1, wherein the UE detects whether MUST exists by detecting a default value contained in the MUST-related information.

9. A user equipment (UE), comprising:
a radio frequency (RF) receiver that receives a higher-layer signaling from a base station by the UE in a mobile communication network to determine whether multiuser superposition transmission (MUST) is enabled;

a detector that detects a physical-layer control signaling related to data transmission based on the higher-layer signaling, wherein the physical-layer control signaling for the UE is carried by a MUST-supporting downlink control information (DCI) format for a configured transmission mode when MUST is enabled, otherwise the physical-layer control signaling is carried by a legacy DCI format for the configured transmission mode when MUST is not enabled;

a decoder that decodes the physical-layer control signaling carried by the single MUST-supporting DCI format to determine scheduling information of the UE and MUST-related information of a co-channel UE; and an interference canceller that applies interference cancellation of a superposed interference signal from the co-channel UE based on the MUST-related information.

10. The UE of claim 9, wherein the MUST-related information comprises power allocation information among the UE and the co-channel UE.

11. The UE of claim 9, wherein the MUST-related information comprises an indication of a modulation order or a modulation and coding scheme (MCS) used by the data transmission intended for the co-channel UE.

12. The UE of claim 9, wherein the MUST-related information comprises an indication of a transmission scheme of the co-channel UE.

13. The UE of claim 9, wherein the MUST-related information comprises an indication of reference signals associated with the data transmission intended for the co-channel UE.

14. The UE of claim 9, wherein the MUST-supporting DCI format is associated with a legacy transmission mode and corresponding transmission schemes.

15. The UE of claim 9, wherein the MUST-supporting DCI format is associated with a new transmission mode supporting MUST operation.

16. The UE of claim 9, wherein the UE detects whether MUST exists by detecting a default value contained in the MUST-related information.

* * * * *